United States Patent [19]

O'Rear et al.

[11] 4,171,257

[45] Oct. 16, 1979

[54] PETROLEUM DISTILLATE UPGRADING PROCESS

[75] Inventors: Dennis J. O'Rear, Tiburon; Jerome F. Mayer, San Anselmo, both of Calif.

[73] Assignee: Chevron Research Company, San Francisco, Calif.

[21] Appl. No.: 954,062

[22] Filed: Oct. 23, 1978

[51] Int. Cl.² ............... C10G 11/04; C10G 13/04; B01J 29/28; C10L 1/04
[52] U.S. Cl. .................................. 208/120; 208/89; 208/254 R; 585/653
[58] Field of Search ............... 208/120, 111, 15, 18, 208/89, 100; 260/677 R, 683 R

[56] References Cited

U.S. PATENT DOCUMENTS

| | | | |
|---|---|---|---|
| 3,700,585 | 10/1972 | Chen et al. | 208/111 |
| 3,770,614 | 11/1973 | Graven | 208/62 |
| 3,894,938 | 7/1975 | Gorring et al. | 208/97 |
| 3,894,939 | 7/1975 | Garwood et al. | 208/111 |

*Primary Examiner*—Delbert E. Gantz
*Assistant Examiner*—G. E. Schmitkons
*Attorney, Agent, or Firm*—D. A. Newell; R. H. Davies; M. K. Bosworth

[57] ABSTRACT

A petroleum distillate feed is upgraded and a substantial $C_3$-$C_4$ olefin product fraction produced by contacting the feed with H-ZSM-5 zeolite at (1) a temperature in the 500°–800° F. range, (2) a pressure below about 13 atmospheres gauge, and (3) an LHSV in the 0.1–15 V/V/Hr range, and fractionating the effluent product stream.

7 Claims, No Drawings

PETROLEUM DISTILLATE UPGRADING PROCESS

BACKGROUND OF THE INVENTION

1. Field of the Invention

This invention relates to dewaxing of petroleum distillates thereby producing an upgraded feed and a $C_3$–$C_4$ olefin product fraction. This invention deals with hydrodewaxing a distillate feed using a ZSM-5 zeolite catalyst in its hydrogen form (H-form). More particularly, it relates to dewaxing a distillate feed and producing $C_3$–$C_4$ olefins by contacting the feed with an H-ZSM-5 catalyst under low-pressure conditions.

2. Description of the Prior Art

Dewaxing of virgin petroleum distillates using a ZSM-5 catalyst is known in the art (see, for example, U.S. Pat. Nos. 3,894,939—W. E. Garwood—and 4,067,797—N. Y. Chen et al). However, these known processes suffer from disadvantages, including (1) high catalyst fouling or deactivating rates and (2) little or none of the $C_3$–$C_4$ product fraction is $C_3$–$C_4$ olefins.

It is an object of this invention to provide a novel process for carrying out catalytic upgrading of a petroleum distillate in a more effective manner.

It is an object of this invention to provide a process in which at least a substantial portion of the product produced by catalytically dewaxing a distillate using ZSM-5 zeolite is a $C_3$–$C_4$ olefin fraction.

Other and additional objects of this invention will be clear from a consideration of the complete specification including the claims thereof.

SUMMARY OF THE INVENTION

A process is provided for upgrading a petroleum distillate feed and producing at least a substantial $C_3$–$C_4$ olefin product fraction, by (1) producing an effluent stream by contacting said feed with a catalyst consisting essentially of ZSM-5 crystalline aluminosilicate which is substantially in the H-form, said contacting being under conditions including (a) a temperature in the range of from about 500° to 800° F.; (b) a pressure below about 13 atmospheres gauge, and (c) a liquid hourly space velocity in the range of from about 0.1 to 15, said feed having a content of nitrogen-containing impurities, calculated by weight as nitrogen, below about 5 ppm; and (2) recovering said upgraded feed and olefin fraction by fractionating said effluent stream.

By "nitrogen-containing impurities" as used herein is meant organic nitrogen-containing compounds indigenous to crude petroleum and syncrude oils and/or as present in their conventionally hydroprocessed distillate fractions.

EMBODIMENT

In a preferred embodiment a gas oil is dewaxed with a significant concurrent production of a $C_3$–$C_4$ olefin product fraction in good yield. A typical oil has the following characteristics:

| | |
|---|---|
| Boiling Point Range (ASTM D-1160), °F. | 445 to 820 |
| Gravity, °API | 37.8 |
| Aniline Point, °F. | 200.2 |
| Total Nitrogen, ppmw as N | 0.5 |
| Sulfur, ppmw as S | 20 |
| Ramsbottom Carbon | 0.5 |
| Refractive Index (80° C.) | 1.4375 |

| -continued | |
|---|---|
| Density (70° C.) | 0.798 |
| Average Molecular Weight | 275 |

The contacting of the feed with a catalyst consisting of a composite of H-ZSM-5 zeolite in a porous alumina matrix (65/35 weight ratio of zeolite to matrix) is carried out in a fixed-bed reactor under conditions including:

| | |
|---|---|
| Temperature, °F. (average) | 750 |
| Space Velocity, LHSV, V/V/Hr | 2.0 |
| Total Pressure, psig | 25 |
| Hydrogen Partial Pressure, psia | 0 |
| Recycle Gas, SCF/B | 0 |

Typical results from use of the above-described representative feed and conditions include the following weight percent yields

| | |
|---|---|
| $C_1$ | 0.0 |
| $C_2$ (total) | 0.01 |
| $C_3$ (total) | 2.86 |
| Propene | 1.59 |
| $C_4$ | 9.66 |
| Butene | 7.03 |
| $C_5$–180° F. | 12.19 |
| 180°–380° F. | 6.54 |
| 380°–500° F. | 7.14 |
| 500° F.–End Point | 61.60 |
| Total $C_5+$ | 87.49 |

Under the above conditions and using a low-nitrogen feedstock, the above catalyst experiences a fouling rate of only 0.02° F. per hour. This rate, surprisingly, is but about one-fifth the expected rate in view of the prior art, for example: (1) U.S. Pat. No. 4,067,797, N. Y. Chen et al; and (2) the article entitled "New Process Cuts Pour Point of Distillates" by N. Y. Chen et al, The Oil and Gas Journal, June 1977, pp. 165–170.

The Catalyst

ZSM-5 crystalline aluminosilicate zeolite and its H-form (H-ZSM-5) are described in the prior art, for example U.S. Pat. Nos. 3,702,886, R. J. Argauer et al, and 3,770,614, R. G. Graven. The H-form of the ZSM-5 zeolite is obtained by conventional base and/or ion-exchange methods routinely employed in the zeolite art, including customary drying and calcining steps. Preferably the ZSM-5 zeolite catalyst herein has a minimal sodium content, for example by weight less than 1 weight percent, more preferably less than about 100 ppm, although a ZSM-5 zeolite having a larger sodium contents exhibits a relatively useful catalytic activity for present purposes.

The ZSM-5 catalyst may be in any convenient form, that is, as required for ordinary fixed-bed, fluid-bed or slurry use. Preferably it is used in a fixed-bed reactor and in a composite with a porous inorganic binder or matrix in such proportions that the resulting product contains from 1% to 95% by weight, and preferably from 10% to 70% by weight, of the zeolite in the final composite.

The term "porous matrix" includes inorganic compositions with which a zeolite can be combined, dispersed, or otherwise intimately admixed wherein the matrix may or may not be catalytically active in a hydrocarbon cracking sense. The porosity of the matrix can either be inherent in the particular material or it can be caused by mechanical or chemical means. Representative of satisfactory matrices include pumice, firebrick, diatomaceous earths, and inorganic oxides. Representative inorganic oxides include alumina, silica, amorphous silica-alumina mixtures, naturally occurring and conventionally processed clays, for example bentonite, kaolin and the like, as well as other siliceous oxide mixtures such as silia-magnesia, silica-zirconia, silica-titania and the like.

The compositing of the zeolite with an inorganic oxide matrix can be achieved by any suitable known method wherein the zeolite is intimately admixed with the oxide while the latter is in a hydrous state, for example as a hydrosol, hydrogel, wet gelatinous preciptate, or in a dried state or combinations thereof. A convenient method is to prepare a hydrous mono or plural oxide gel or cogel using an aqueous solution of a salt or mixture of salts, for example aluminum sulfate, sodium silicate and the like. To this solution is added ammonium hydroxide, carbonate, etc., in an amount sufficient to precipitate the oxides in hydrous form. After washing the precipitate to remove at least most of any water-soluble salt present in the precipitate, the zeolite in finely divided state is thoroughly admixed with the precipitate together with added water or lubricating agent sufficient in amount to facilitate shaping of the mix as by extrusion.

The Feed

Petroleum hydrocarbon distillates, and the like, containing at least a significant (5 volume percent) content of normal paraffins and/or slightly branched paraffins are satisfactory feeds for the present process provided that they have a content of nitrogen-containing impurities, calculated as nitrogen, which is less than 5, preferably less than 1, ppmw.

Representative feeds include atmospheric or vacuum gas oils and fractions and mixtures thereof, for example having normal boiling point ranges in the range 400° to 1000°, preferably 500° to 850° F.

Process feeds herein may contain sulfur-containing impurities. However, the resulting product, in general, will also contain undesirable sulfur-containing impurities to some degree. Preferably process feeds herein contain, calculated as sulfur, less than 20 ppmw of sulfur-containing impurities.

Process Conditions

The process conditions satisfactory for use in the process of the invention may vary, depending upon such factors as the feed, the conversion desired, the catalyst age and the like. In general, satisfactory conditions include:

|  | Broad Range | Preferred Range |
|---|---|---|
| Temperature, °F. | 500–800 | 550–750 |
| Pressure, psig | <200 | 0–25 |
| Space Velocity, LHSV, V/V/Hr. | 0.5–10 | 2–4 |

The yield of $C_3$–$C_4$ olefins has been found to be very sensitive to the system pressure. Thus, at about 500 psig, the yield of these olefins is negligible. As the pressure is decreased below 500 psig, an increasingly significant yield of $C_3$–$C_4$ olefins is produced. These olefins are especially desirable and are valuable for many well-known uses in the petroleum and chemical processing arts, whereas their alkane counterparts are far less desirable products. The yield of $C_3$–$C_4$ olefins varies, depending upon the particular feed, conditions and catalyst employed, in the range of from about 2 to 10 weight percent of the feed converted.

What is claimed is:

1. A process for upgrading a petroleum distillate feed consisting essentially of hydrocarbons having a normal boiling point range in the range of from about 400° to 1000° F. and producing a $C_3$–$C_4$ olefin product fraction, based upon feed converted, in an amount in the range of from about 2 to 10 weight percent, comprising:
   (1) producing an effluent stream containing a $C_3$–$C_4$ olefin product fraction by contacting said feed with a catalyst consisting essentially of ZSM-5 crystalline aluminosilicate which is substantially in the H-form, said contacting being under conditions including (a) a temperature in the range of from about 500° to 800° F.; (b) a pressure below about 13 atmospheres gauge, and (c) a liquid hourly space velocity in the range of from about 0.1 to 15, said feed having a content of nitrogen-containing impurities, calculated by weight as nitrogen, below about 5 ppm; and
   recovering said upgraded feed and $C_3$–$C_4$ olefin product fraction by fractionating said effluent stream.

2. A process as in claim 1 wherein said temperature is about 750° F., said space velocity is about 2, and said pressure is about 25 psig.

3. A process as in claim 1 wherein said catalyst is a composite of said zeolite and a porous binder or matrix, and said composite contains an amount of the zeolite in the range of from about 1 to 95 weight percent.

4. A process as in claim 1 wherein said feed has (1) a normal boiling point range in the range of from about 400° to 1000° F., (2) a sulfur-containing impurities content, calculated as sulfur, below about 20 ppm, and (3) a nitrogen-containing impurities content below about 1 ppmw.

5. A process as in claim 4 wherein said normal boiling point range is 500° to 800° F.

6. A process as in claim 1 wherein said catalyst is in a composite with a porous inorganic binder or matrix in such proportions as to contain said zeolite, in parts by weight, in an amount in the range of from about 1 to 95 percent.

7. A process as in claim 6 wherein said amount of zeolite is in the range 10 to 70 percent.

* * * * *